United States Patent
Lundström et al.

(10) Patent No.: US 6,754,343 B2
(45) Date of Patent: Jun. 22, 2004

(54) LEVER DEVICE FOR A HOLDER ADAPTED TO RECEIVE A HAND-HELD UNIT, AND SUCH A HOLDER

(75) Inventors: Kristina Lundström, Solna (SE); Jan Atterklint, Skärholmen (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 360 days.

(21) Appl. No.: 09/864,781

(22) Filed: May 24, 2001

(65) Prior Publication Data

US 2002/0018559 A1 Feb. 14, 2002

Related U.S. Application Data

(60) Provisional application No. 60/207,704, filed on May 26, 2000.

(51) Int. Cl.[7] .................................................. H04M 1/00

(52) U.S. Cl. ....................................... 379/446; 379/455

(58) Field of Search ................................. 379/446, 454, 379/455, 449; 248/221.11, 222.12

(56) References Cited

U.S. PATENT DOCUMENTS 6,185,302 B1 * 2/2001 Rytkonen et al. ........... 379/446

* cited by examiner

Primary Examiner—Jack Chiang
(74) Attorney, Agent, or Firm—Jenkens & Gilchrist, P.C.

(57) ABSTRACT

A lever device for a holder adapted to receive a hand-held unit, such as a mobile telephone is presented herein. The lever device includes a first lever arm connected to a first hinge member, and a first locking arm connected to the first hinge member. The first hinge member has an axis about which the lever device is adapted to rotate. The first spring arm is adapted to cause a spring action of the lever device in relation to the holder while rotating the lever device about the first hinge member. According to the invention, a second lever arm is provided being connected to a second hinge member. The first and second hinge members are spaced apart and aligned with the axis. The first and second lever arms are interconnected by an interconnection member, and a second spring arm is adapted to cause a spring action of the lever device in relation to the holder while rotating the lever device about the second hinge member. The first and second spring arms are adapted to move towards or away from one another during the spring action. At least one guide arm is adapted to keep the first and second hinge members substantially aligned with the axis.

17 Claims, 17 Drawing Sheets

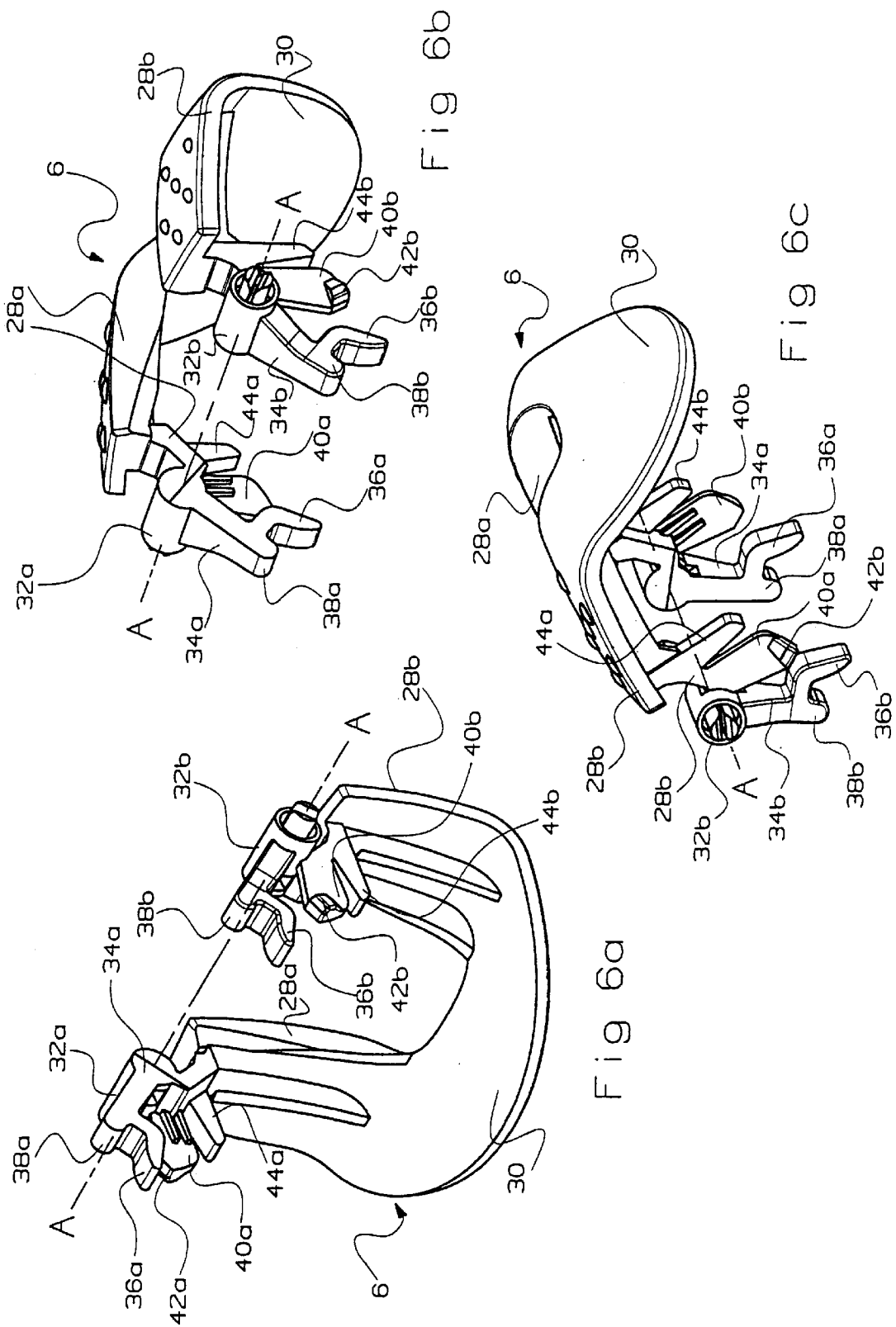

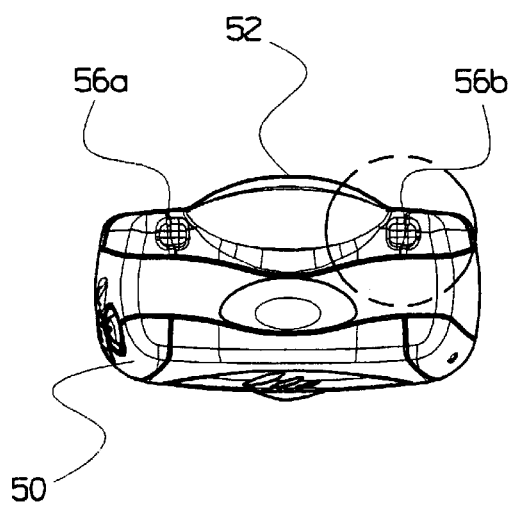
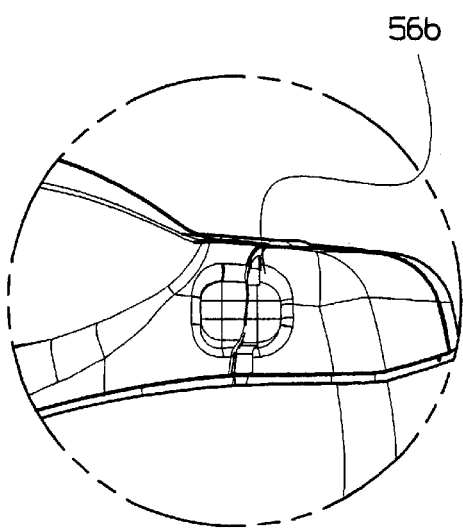
Fig 9a
Fig 9b

LEVER DEVICE FOR A HOLDER ADAPTED TO RECEIVE A HAND-HELD UNIT, AND SUCH A HOLDER

CROSS-REFERENCES TO RELATED APPLICATIONS

The present application claims priority to, and hereby incorporates by reference for any purpose, the entire disclosure of U.S. Provisional Application 60/207,704 filed May 26, 2000.

TECHNICAL FIELD OF THE INVENTION

The present invention relates to a lever device for a holder adapted to receive a hand-held unit, such as a mobile telephone, comprising a first lever arm connected to a first hinge member, and a first locking arm connected to said first hinge member, said first hinge member having an axis about which the lever device is adapted to rotate, and a first spring arm adapted to cause a spring action of the lever device in relation to the holder while rotating the lever device about said first hinge member.

It also relates to a supporting device of a holder for a hand-held device, having a first and a second portion, wherein said first portion comprises a system connector adapted to be connected to a connecting device of said hand-held unit.

It furthermore relates to a holder for a hand-held device, comprising a system connector adapted to be connected to a corresponding system connector of said handheld unit.

BACKGROUND

Such holder comprising such a supporting device and such a lever device has been put on the market by Ericsson Mobile Communications AB as an accessory for the mobile telephone under the trademark "T28". The lever device of that holder is made in one piece. It is disadvantageous as if it were used for hand-held devices provided with a central antenna, it would be necessary to move the lever device to a position on one of the sides of the antenna. This would however cause twisting forces on the phone, which could then cause damage on the connection for an external antenna.

Another holder for a mobile telephone is known from JP-A-08293904. The therein described holder is however disadvantageous, as its lever consists of several parts and is therefore complicated to manufacture and to assemble.

The object of the invention is to provide a holder for a hand-held unit having a central antenna, without the above mentioned disadvantages.

SUMMARY OF THE INVENTION

This has been solved by the lever of the kind initially defined, furthermore being provided with a second lever arm, said second lever arm being connected to a second hinge member, said first and second hinge members being spaced apart and being aligned with said axis, said first and second lever arms being interconnected by an interconnection member, a second spring arm adapted to cause a spring action of the lever device in relation to the holder while rotating the lever device about said second hinge member, said first and second spring arms being adapted to move towards or away from one another during said spring action, and at least one guide arm adapted to keep said first and second hinge members substantially aligned with said axis.

It has also been solved by a supporting device of the initially defined kind, wherein a second portion of said supporting device comprises a third and a fourth hinge member is adapted to receive the first and second hinge members, respectively, of the lever device according to the invention, in such a way that the lever device is hingedly movable relative to the supporting device.

It has furthermore been solved by a holder of the initially defined kind, wherein a third and a fourth hinge member hingedly receives the first and second hinge members, respectively, of the lever device according to the invention, the lever device being movable relative to the supporting device about said axis.

Hereby is achieved a holder, supporting device and lever device with improved stability of the hand-held device when positioned in the holder. Furthermore, unwanted torque is avoided at sensitive points, e.g. at the antenna socket. Furthermore, they are easy to manufacture and to assemble.

Preferably, said guide arm is connected to said first lever arm. Hereby is achieved that side forces created by said spring action are absorbed by the lever itself.

Suitably, a further guide arm is provided, said further guide arm being connected to said second lever arm. Hereby is achieved an improved stability as the side forces are absorbed by the lever.

Advantageously, each of said first and second spring arms is provided with a protrusion directed substantially parallel to the extension of said axis, said protrusions being adapted to co-operate with a guide portion of said holder, for biasing said first and second spring-arms towards or away from one another. Hereby is achieved a controlled biasing of the spring-arms.

Preferably, said protrusions are arranged on the spring arms, such that the protrusions are directed in opposite directions. Hereby is achieved that they are allowed to pass a locking member of the supporting device.

Suitably, each of said locking arms is provided with a guide rib, adapted to be pressed by the rear of said hand-held unit at least during an initial phase, while moving the lever device to a locked state. Hereby is achieved a controlled movement of the lever device.

Advantageously, each of said locking arms is provided with a locking rib, adapted to protrude into a corresponding cavity of said hand-held unit, for keeping said handheld unit in said holder.

Preferably, it is made in one piece of a plastics material by injection moulding. Hereby is achieved a simple and non-expensive manufacture thereof, providing a substantially uniform thickness of material.

DRAWING SUMMARY

In the following, the invention will be described in more detail by reference to the accompanying drawings, in which FIGS. 1a and 1b illustrates a prior art holder for a mobile telephone, FIG. 2 is a perspective view of a holder according to the invention having a support and a lever, FIG. 3 is a front view of the holder shown in FIG. 2, FIG. 4a is a cross-section along the line IVA—IVA in FIG. 3, FIG. 4b shows a part of a cross-section along the line IVB—IVB in FIG. 3, FIG. 5 is side view of the holder shown in FIG. 2, FIGS. 6a–6c are different perspective views of the lever shown in FIG. 2, FIGS. 6d–6e are different plan views of the lever shown in FIGS. 6a–6c, FIG. 7 shows an alternative embodiment of the lever, FIG. 8 is a side view of the holder shown in FIG. 5 supporting a mobile telephone, FIG. 9a is a top view of the mobile telephone shown in FIG. 8, FIG. 9b is a magnification of the part within the circle indicated in FIG. 9a.

Figure 13B:
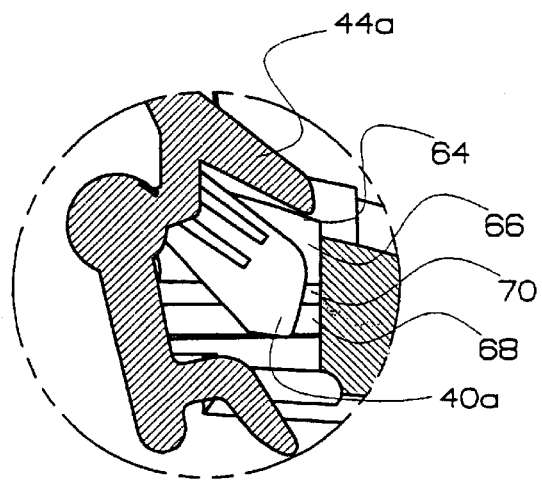
Figures 12, 13A:
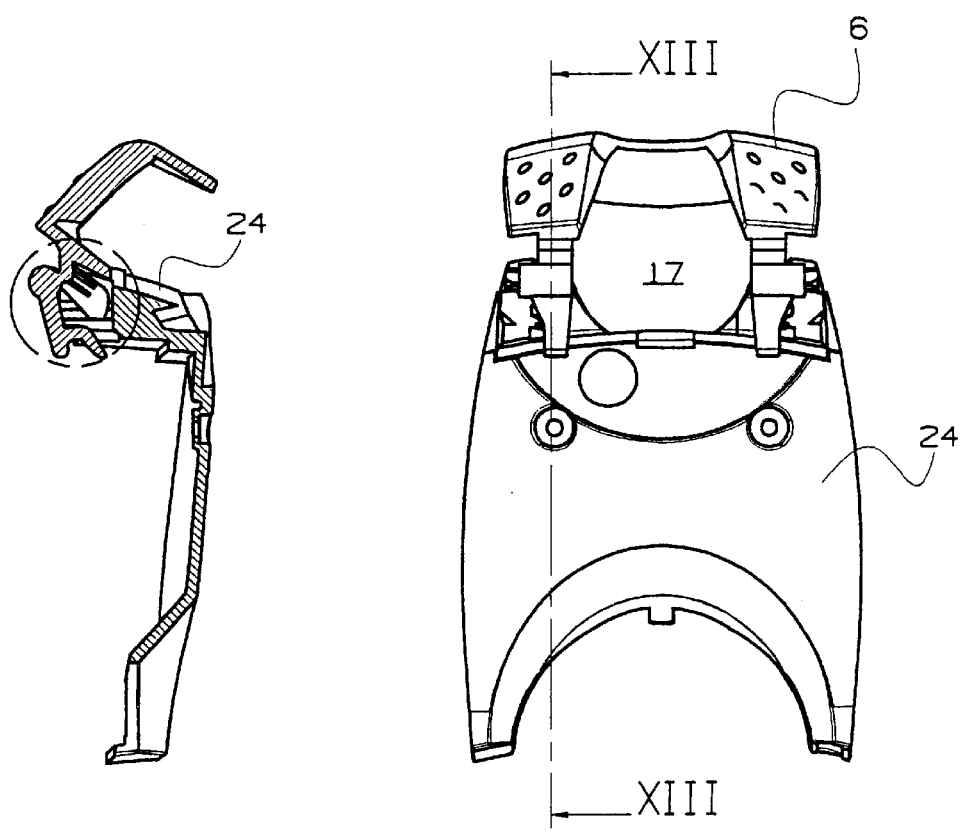
Figure 15B:
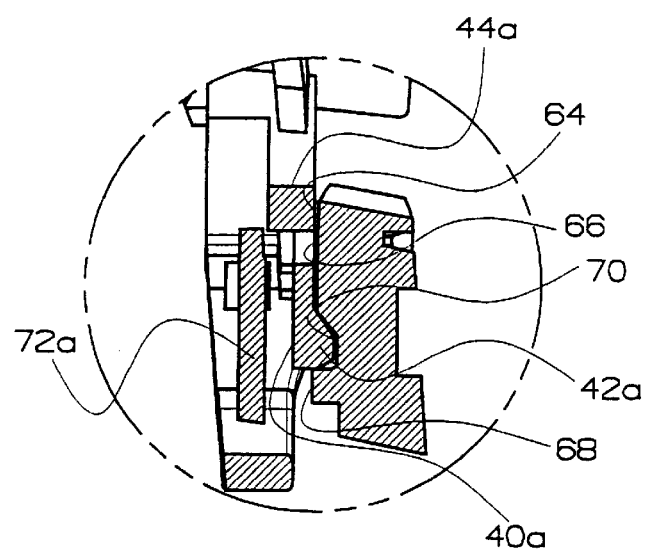
Figure 14:
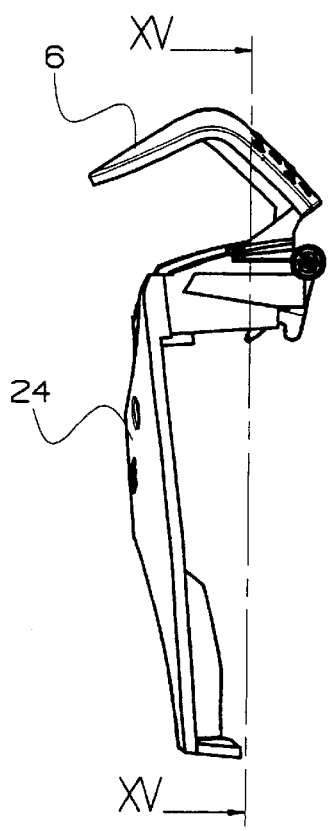
Figure 15A:
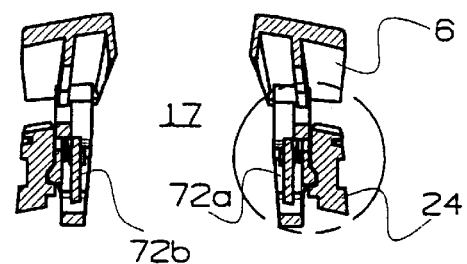

FIGS. 11a–11e illustrate sequentially connection of a mobile telephone to the holder, FIG. 12 is a rear view of an upper portion the holder, FIG. 13a is a cross-section along the line XIII—XIII in FIG. 12, FIG. 13b is a magnification of the part within the circle indicated in FIG. 13a, FIG. 14 is a side view of the upper portion of the holder shown in FIG. 12, FIG. 15a is a cross-section along the line XV—XV in FIG. 14, FIG. 15b is a magnification of the part within the circle indicated in FIG. 15a.

DETAILED DESCRIPTION

Figure 1:
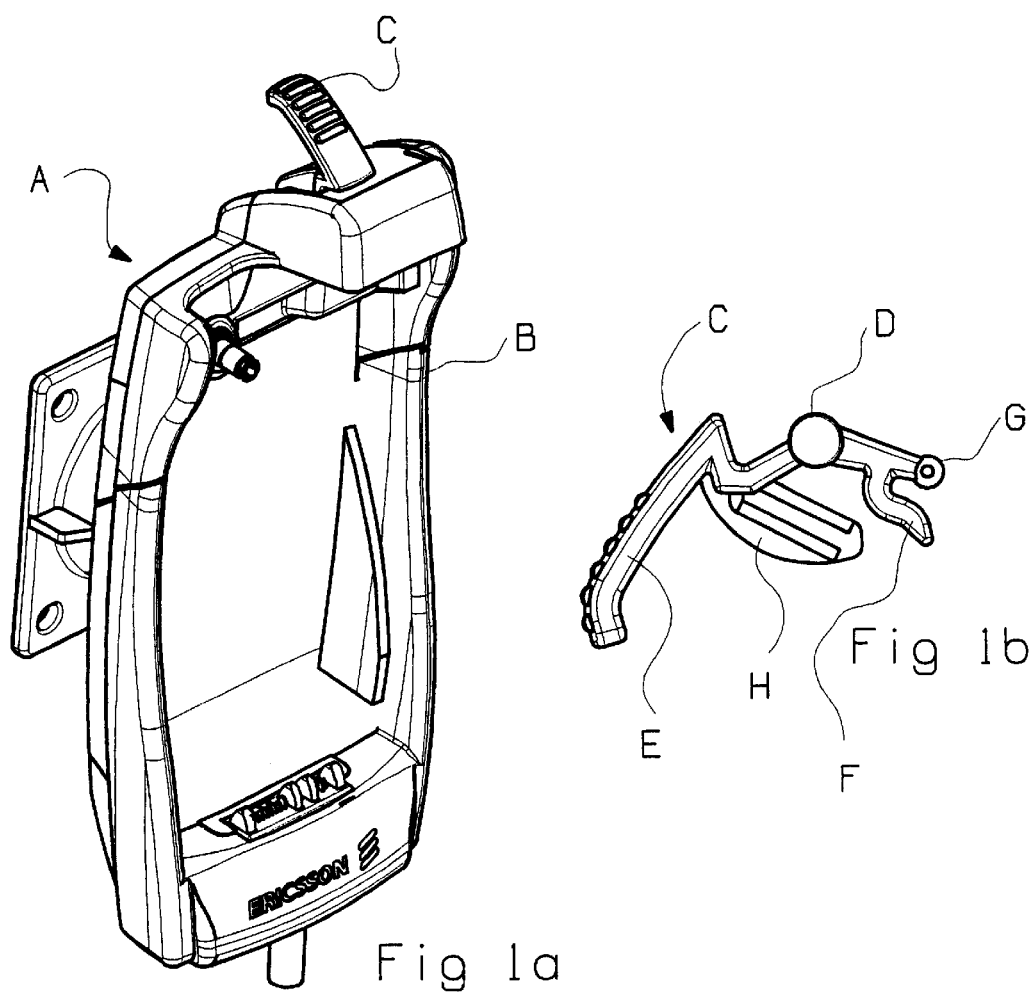

FIG. 1a shows a holder A comprising a support member B and a lever C.

FIG. 1b shows the lever C, which comprises a hinge D, a lever arm E, a guide rib F, a locking rib G and a spring arm H. On the rear side of the spring arm H, a protrusion is provided. When the lever C is lifted or pressed, the lever is rotated about the hinge D while the spring arm H is guided in a slot of the support B. The protrusion is then pressed against a wall of the slot and the spring arm is moved sidewardly so that the protrusion is allowed to be retained in a groove.

Figure 2:
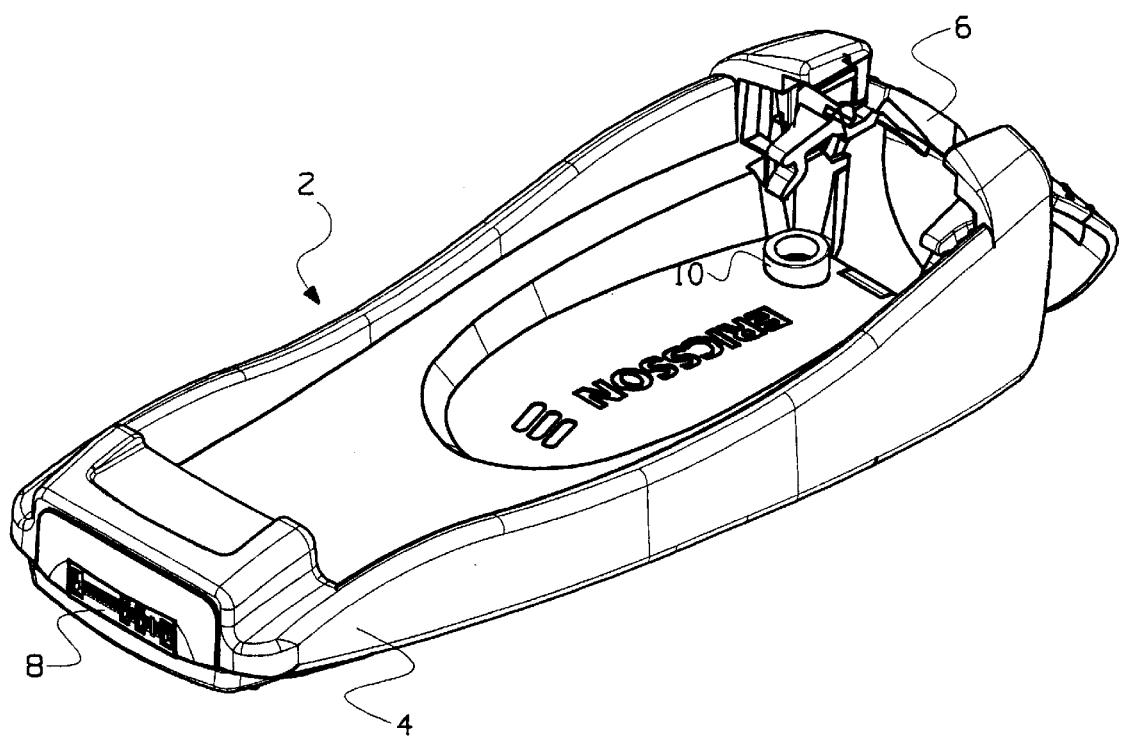

FIG. 2 shows a holder 2 comprising a support 4 and a lever 6 at a top end of the support 4. At the bottom end thereof, a female system connector 8 is provided, for connection of a connector for electric supply, a hands-free set of microphone and loud speaker, a keyboard, a computer etc.

Near the top end of the support 4, a socket 10 for an antenna connector is provided.

Figure 3:
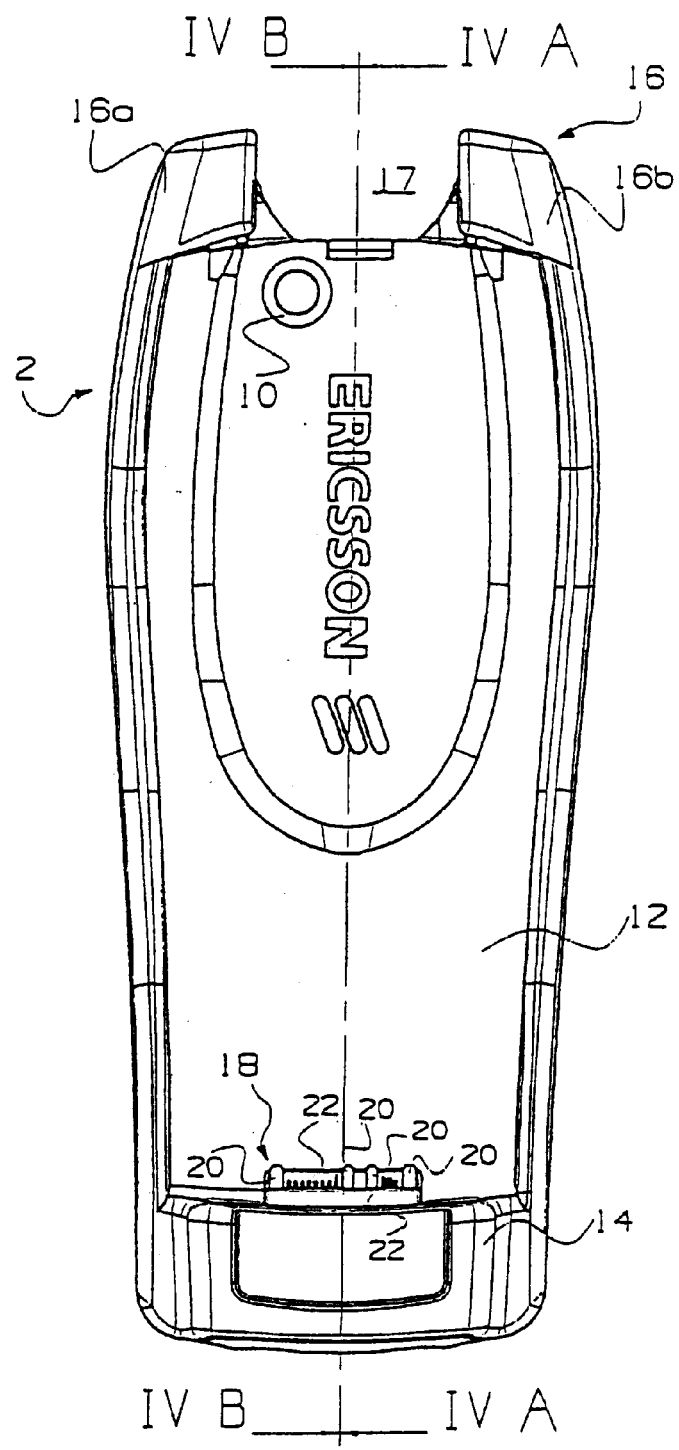

FIG. 3 is a front view of the holder 2. The support 4 comprises a wall 12, a lower first portion 14 and an upper second portion 16 divided into two interconnected parts 16a, 16b, defining an opening 17. At the lower first portion 14, a male system connector 18 is provided. The male system connector 18, is provided with rigid protrusions 20 and spring-loaded contact points 22 adapted to be connected to corresponding contact pads of a mobile telephone system connector (see FIG. 9b), and also to corresponding contact pads of the female system connector 8.

Figure 4A:
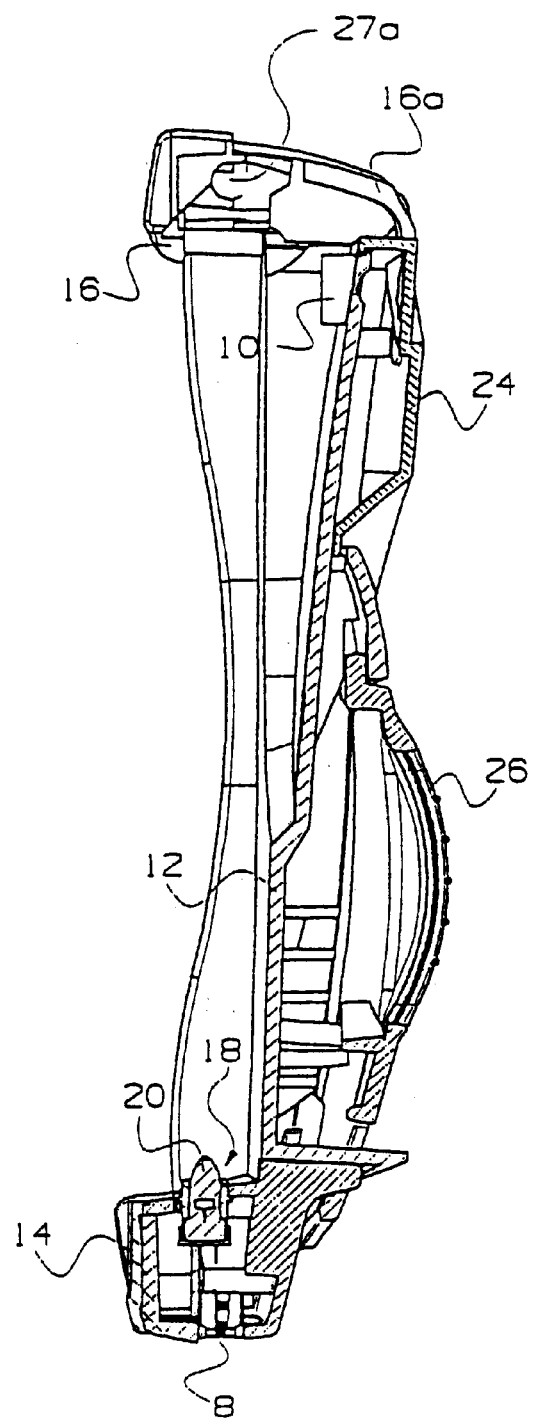

FIG. 4a is a cross-section along the line IVA—IVA in FIG. 3. On the rear side of the support 4, an upper portion 24, is provided, which is disconnectible.

Furthermore, a disconnectible lower portion 26 is provided, constituting an adjustment member for achieving a variable angle of inclination of the holder in relation to e.g. the dash board of a car. A hinge member 27a in the form of a cylindrical opening is provided.

Figure 4B:
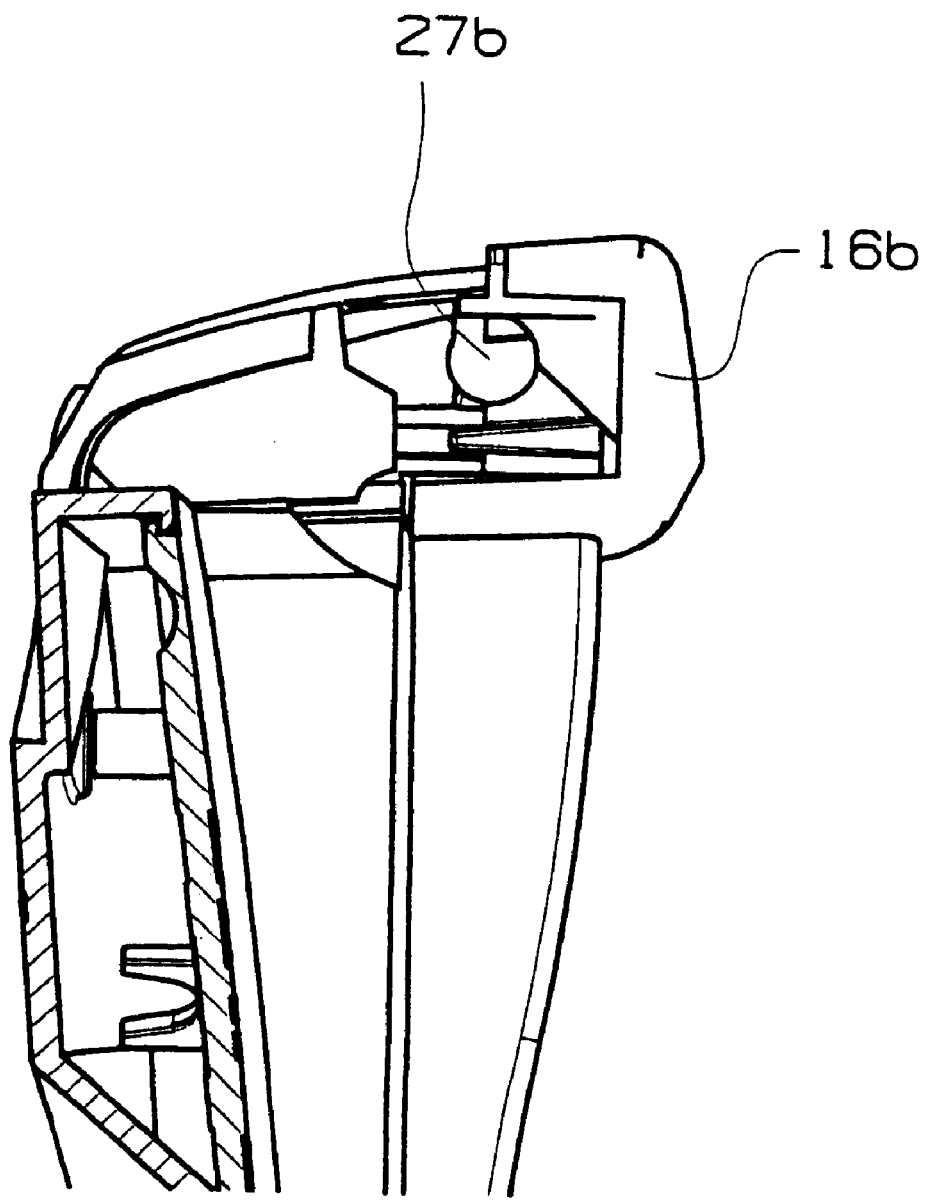

FIG. 4b shows a part of a cross-section along line IVB—IVB in FIG. 3. A further hinge member 27b in the form of a cylindrical opening is provided. The hinge members 27a, 27b are coaxial.

Figure 5:
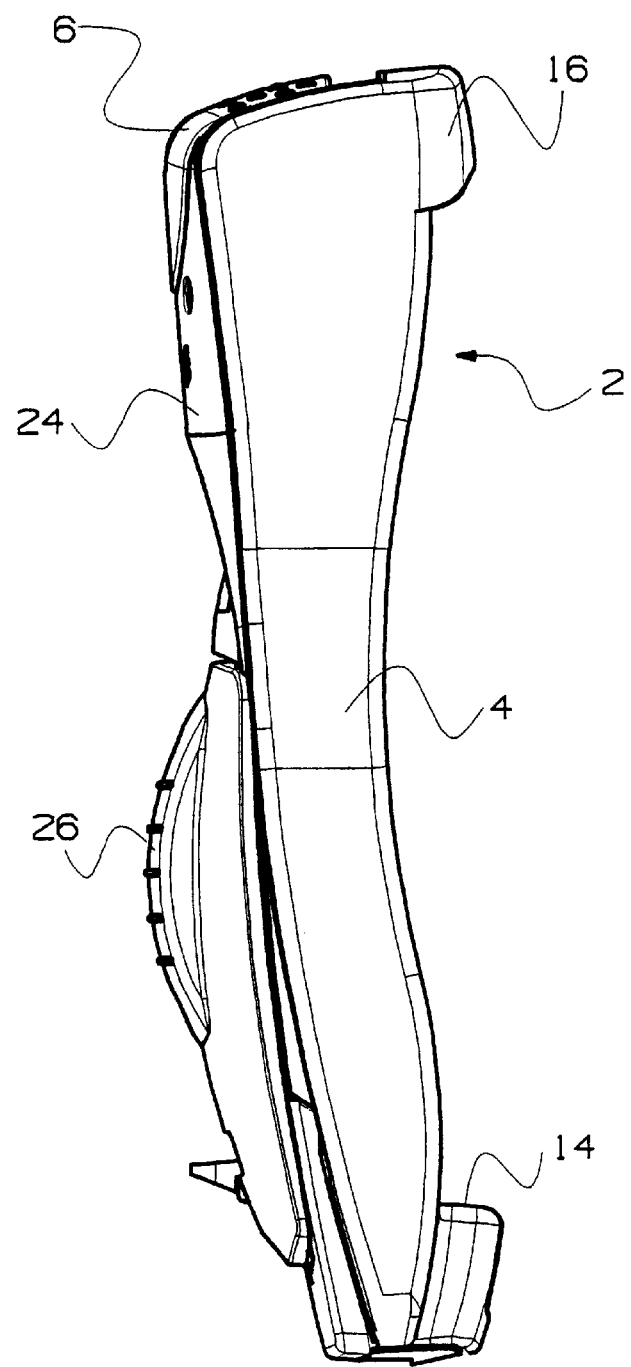
Figure 6D:
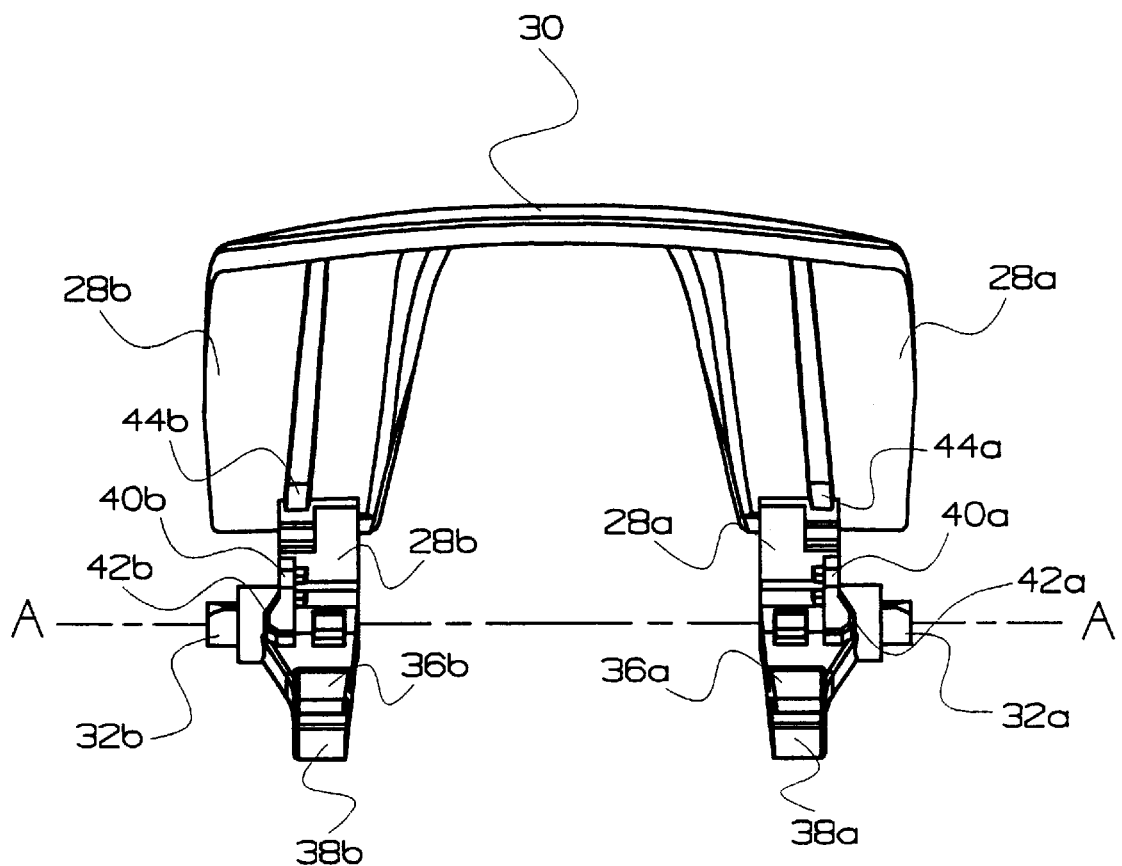
Figure 6E:
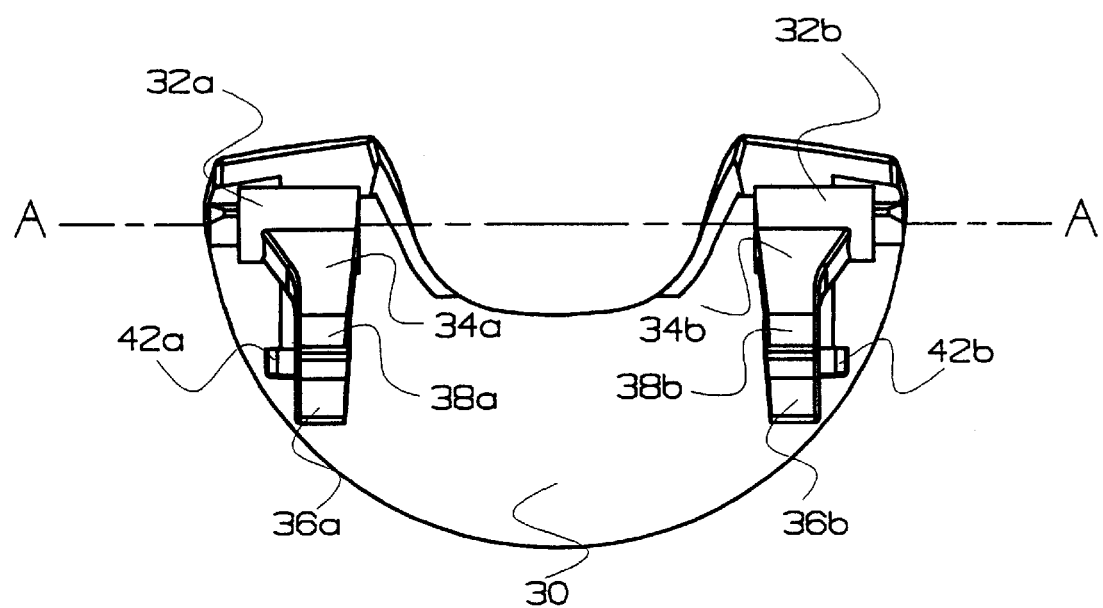

FIG. 5 shows the holder 2 ready to receive a mobile telephone. Accordingly, the lever device 6 is in an open state.

FIGS. 6a–6e show the lever device 6 from different views. The lever device comprises first and second lever arms 28a, 28b interconnected by an interconnection member 30. The lever arms 28a, 28b are connected to first and second hinge members 32a, 32b for allowing rotation of the lever device 6 about an axis A—A when arranged in hinge members 27a, 27b of parts 16a, 16b of the upper portion 16 of the support.

First and second locking arms 34a, 34b extend radially from the hinge members 32a, 32b. Each of said locking arms 34a, 34b is provided with a guide rib 36a, 36b for receiving the rear of a hand-held unit, and a locking rib 38a, 38b for supplying a pressing force on mobile telephone for keeping the hand-held unit in the holder 2.

First and second spring arms 40a, 40b extend from the lever arms 28a, 28b. Each spring arm 40a, 40b is provided with a protrusion 42a, 42b in opposite directions on the outside of the spring arms. First and second guide arms 44a, 44b extend from the lever arms 28a, 28b, substantially parallel to said spring arms 40a, 40b.

The function of the spring arms 40a, 40b, the protrusions 42a, 42b and the guide arms 44a, 44b will be discussed below.

Figure 7:
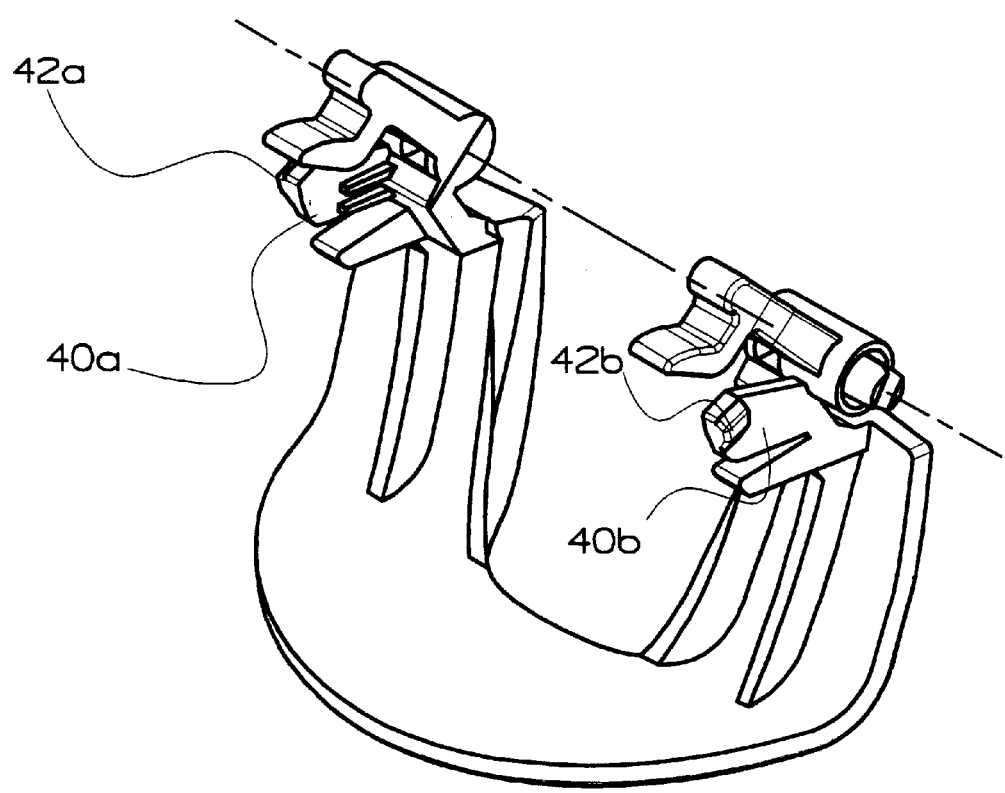

FIG. 7 shows an alternative embodiment of the lever device 6. According to this embodiment, the protrusions 42a, 42b are arranged in opposite directions on the side of the spring arms 40a, 40b facing one another.

Figure 8:
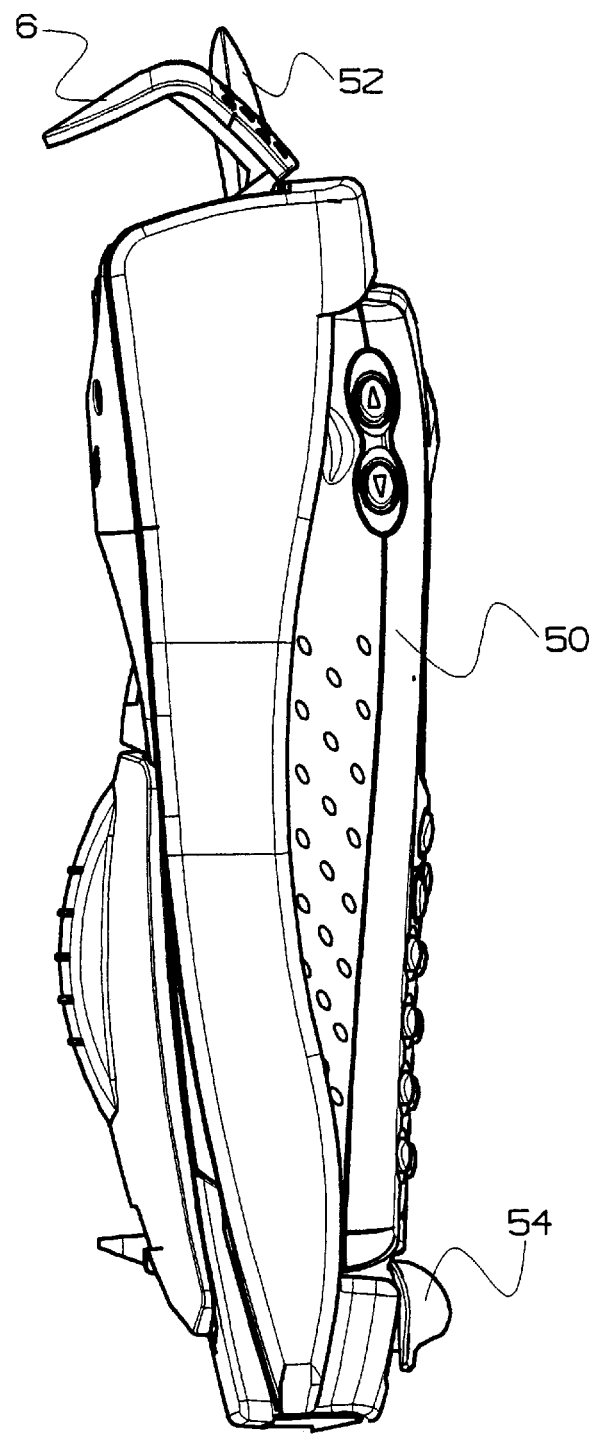

FIG. 8 shows the holder 2 when supporting a mobile telephone 50 provided with a centrally disposed antenna 52, and a foldable system connector cover 54. The lever device 6 is in a locked state.

Figure 9C:
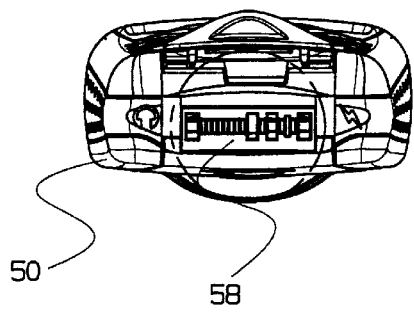
FIG. 9c is a bottom view of the mobile telephone shown in FIG. 8.
Figure 9D:
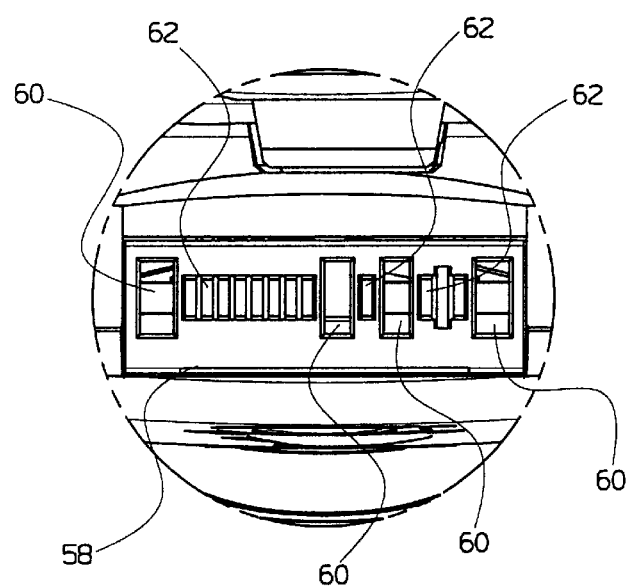
FIG. 9d is a magnification of the part within the circle indicated in FIG. 9c.

FIG. 9a is a top view of the mobile telephone 50, which is provided with a pair of depressions 56a, 56b adapted to receive the locking ribs 38a, 38b, respectively.

FIG. 9b is a bottom view of the mobile telephone 50, which is provided with a system connector 58 defining four openings 60 adapted to receive the protrusions 20, respectively, of the male system connector 18. The system connector 58 is furthermore provided with a plurality of contact pads 62 corresponding to the contact pins 22, respectively, of the male system connector 18.

Figure 10:
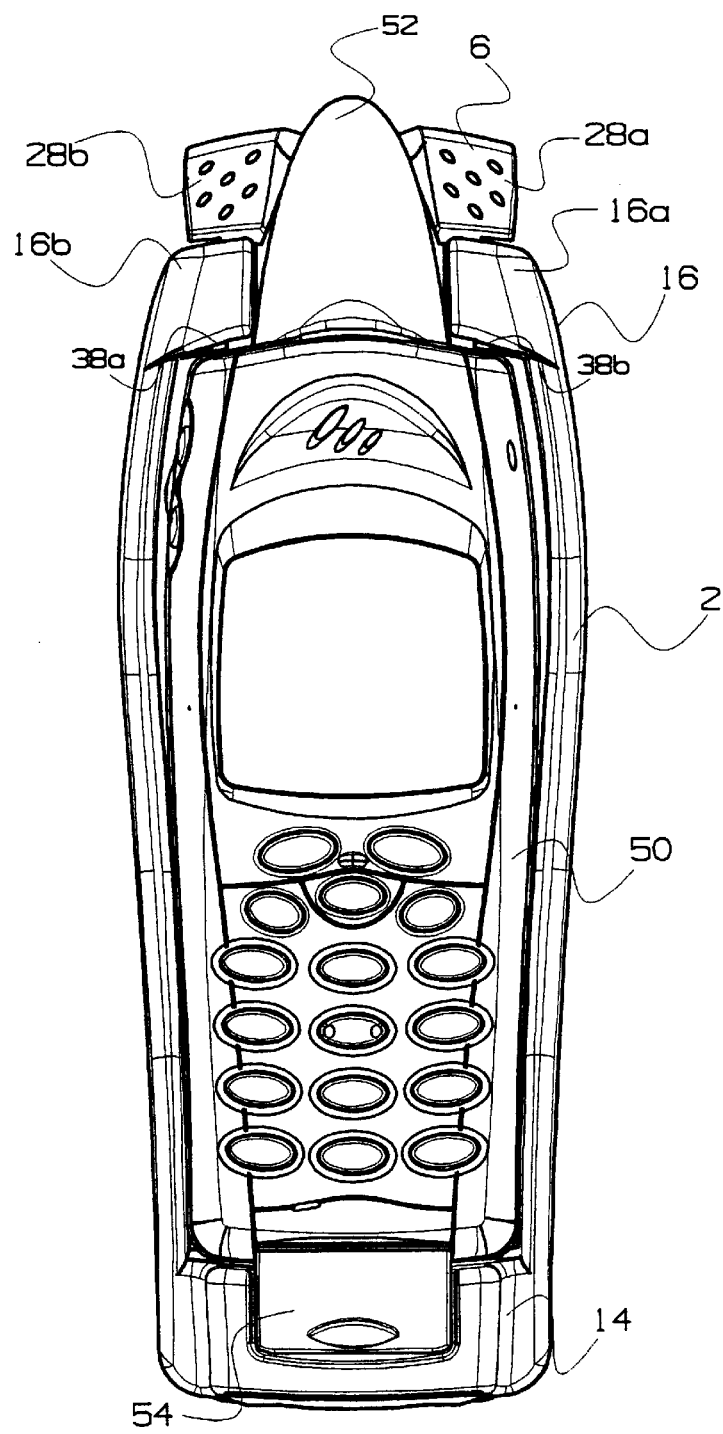
FIG. 10 is a front view of the holder and mobile telephone shown in FIG. 7.

FIG. 10 is a front view of the holder 2 and the mobile telephone 50. The antenna 52 thereof has been introduced into the opening 17 such that the parts 16a and 16b of the upper portion 16, as well as the lever arms 28a, 28b of the lever device 6 are disposed on each side of the antenna 52. The locking ribs 38a, 38b are placed in the depressions 56a, 56b and are thus directed downwards.

Figure 11E:
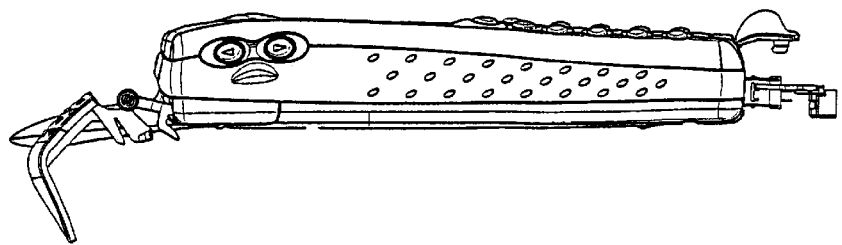
Figure 11D:
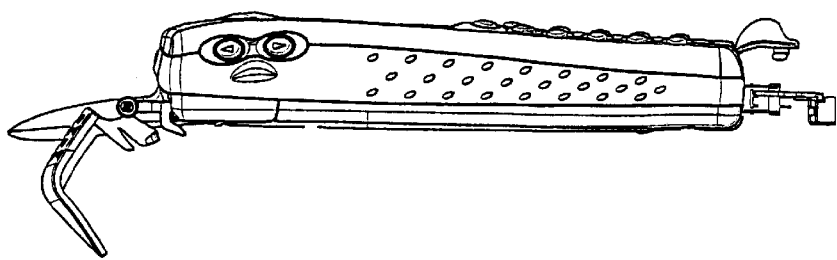
Figure 11C:
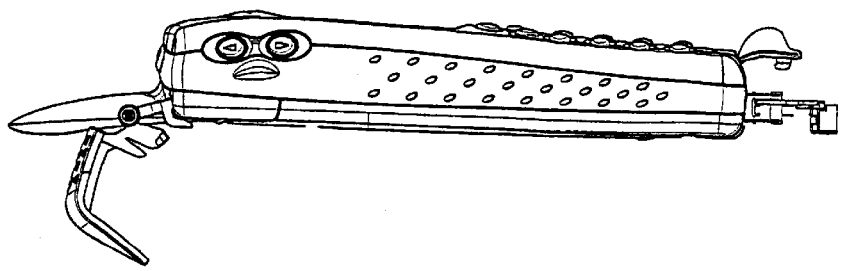
Figure 11B:
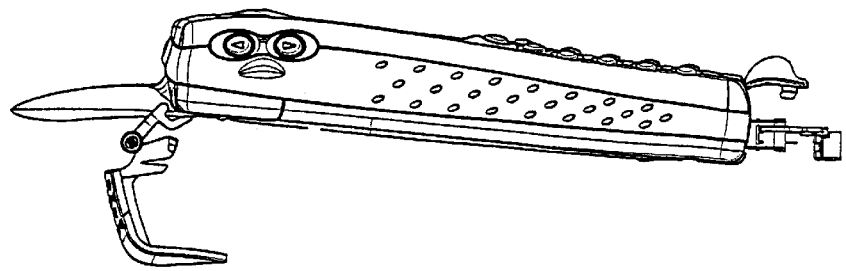
Figure 11A:
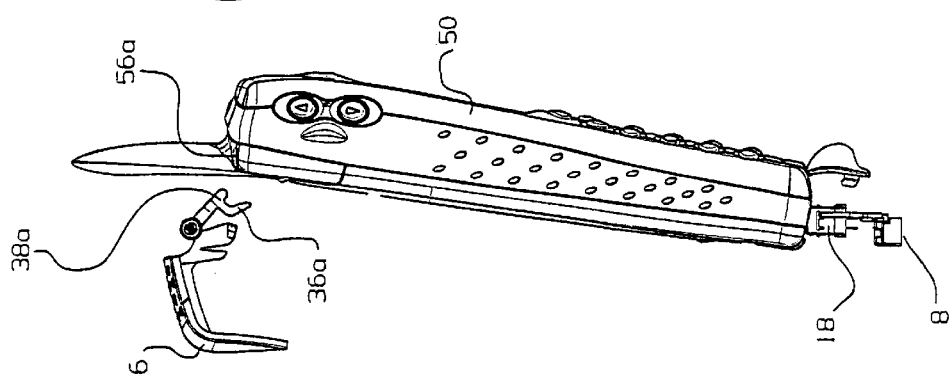

In FIGS. 11a–11c, most parts of the holder have been omitted for reasons of clarity. Thus, only the lever device 6 and the interconnected male and female system connectors 18, 8 are shown.

In FIG. 11a, the system connector 58 of the mobile telephone 50 is supported by the male system connector 18. In this position, the protrusions 20 have slightly entered into the openings 60, respectively, and the spring-loaded contact points 22 are contacting the corresponding contact pads 62 of the system connector 58.

In FIG. 11b, the rear side of the mobile telephone rests against the guide ribs 36a, 36b.

In FIG. 11c, the mobile telephone is pressed against the guide ribs 36a, 36b causing the lever device 6 to rotate about the axis A—A. The locking ribs 38a, 38b enters the depressions 56a, 56b, respectively. Hereby, the mobile telephone is pressed towards the male system connector 18, resulting in that the protrusions 20 continue farther inside the openings 60, while the spring-loaded contact points 22 are pressed downwards.

In FIG. 11d, the lever device 6 has been forced to rotate further. The locking ribs 38a, 38b are directed towards the male system connector 18, resulting in that the mobile telephone 50 and the spring-loaded contact points 22 are pressed downwards to a maximum extent. In this position, the mobile telephone solely rests below on the male system connector 18, not on wall the lower portion 14, and is supported above solely by the locking ribs 38a, 38b. This position is thus unstable, i.e. the rotation may continue by itself or return in the opposite direction.

In FIG. 11e, the mobile telephone 50 no longer touches the guide ribs 36a, 36b. They are instead resting against a part of the upper portion 24 and the locking ribs 38a, 38b have taken a stable position, after having passed the unstable position, resulting in that the mobile telephone moves rearwards towards the wall 12 and slightly upwards towards the upper portion 16, due to the continued rotational movement.

Thus, locking of the mobile telephone relative to the holder 2 of is achieved.

However, in order to increase the locking property of the holder 2, the spring arms 40a, 40b of the lever device 6 constitute further locking means.

FIG. 12 is a rear view of the upper portion 24 the holder 2. The lever device 6 is in a locked state.

FIG. 13a is a cross-section along the line XIII—XIII in FIG. 12. As can be better seen in the magnification shown in FIG. 13b, the upper portion 24 is provided with an inner wall 64, comprising a an upper part 66, a lower part 68 and a middle part 70. In front of the inner wall 64 is shown the spring arm 40a and the guide arm 44a.

In FIG. 14, a side view of the upper portion 24 the holder 2 is shown, the lever device 6 still being in a locked state.

FIG. 15a is a cross-section along the line XV—XV in FIG. 14. In the magnification of FIG. 13b, is shown that the upper parts 66 and lower part 68 of the inner wall 64 extend substantially in the same plane, whereas the wall of the middle part 70 forms a groove, into which the protrusion 42a extends.

As can be seen in FIG. 15a, the upper portion 24 is designed in the same manner on the opposite side of the opening 17, however reversed.

When the lever device is moved from the position shown in FIGS. 11c via 11d to the position of FIG. 11e, the protrusions 42a, 42b are pressed towards the opening 17, i.e. towards one another, by the lower part 68. When the lever device has taken the position shown in FIG. 11e, the protrusion has moved into the groove at the
middle part 70 (see also the magnification of FIG. 15b). The inner wall 64 thus constitutes a guide means for the spring arms 40a, 40b).

When the spring arms are forced to move towards one another, a bending moment of the lever arms 28a, 28b is caused. In order prevent movement also of the lever arms 28a, 28b towards one another, the guide arms 44a, 44b are supported by support members 72a, 72b in a direction perpendicular to the axis A—A and on the side of the guide arms 44a, 44b facing one another.

Of course, in the embodiment of the lever device shown in FIG. 7, the inner walls 66 and the support members 72a, 72b of the upper portion 24 are arranged on the opposite side of the spring arms 40a, 40b and the guide arms 44a, 44b. Accordingly, the spring arms 40a, 40b are then pressed away from one another, causing a bending moment of the lever arms 28a, 28b in the opposite direction. The guide arms 44a, 44b are thus supported by support members 72a, 72b in a direction perpendicular to the axis A—A and on the side of the guide arms 44a, 44b not facing one another.

When the mobile telephone 50 is to be removed from the holder 2, the user presses the lever device 6, which is large and therefore facilitates such pressing.

The force needed to release the mobile telephone must overcome the stable position shown in FIG. 11e, i.e. the force of the locking ribs 38a, 38b pressing against the mobile telephone in the protrusions 56a, 56b, and the spring force of the spring arms 40a, 40b. When the lever device 6 has moved to the position shown in IG. 11d, they have both been overcome, and the mobile telephone is held in place by friction. Further pressing of the lever device 6 releases the upper part of the mobile phone 50 from the holder 2, and it can now be lifted away from the male system connector 18.

What is claimed is:

1. A lever device for a holder adapted to receive a hand-held unit, such as a mobile telephone, comprising a first lever arm connected to a first hinge member, and a first locking arm connected to said first hinge member, said first hinge member having an axis about which the lever device is adapted to rotate, and a first spring arm adapted to cause a spring action of the lever device in relation to the holder while rotating the lever device about said first hinge member, said lever device further comprising:

a second lever arm connected to a second hinge member, such that said first and second hinge members are spaced apart and aligned with said axis;

an interconnection member connecting said first and second lever arms;

a second spring arm adapted to cause a spring action of the lever device in relation to the holder while rotating the lever device about said second hinge member said first and second spring arms being adapted to move towards or away from one another during said spring action; and at least one guide arm adapted to keep said first and second hinge members substantially aligned with said axis.

2. A lever device according to claim 1, wherein said guide arm is connected to said first lever arm.

3. A lever device according to claim 1 or 2, wherein a further guide arm is provided, said further guide arm being connected to said second lever arm.

4. A lever device according to claim 1, wherein each of said first and second spring arms is provided with a protrusion directed substantially parallel to the extension of said axis, said protrusions being adapted to co-operate with a guide means of said holder, for biasing said first and second spring-arms towards or away from one another.

5. A lever device according to claim 4, wherein said protrusions are arranged on the spring arms, such that the protrusions are directed in opposite directions.

6. A lever device according to claim 1, wherein each of said locking arms is provided with a guide rib, adapted to be pressed by the rear of said hand-held unit at least during an initial phase, while moving the lever device to a locked state.

7. A lever device according to claim 1, wherein each of said locking arms is provided with a locking rib adapted to protrude into a corresponding cavity of said hand-held unit, for keeping said hand-held unit in said holder.

8. A lever device according to claim 1, wherein said lever device is made in one piece of a plastics material by injection molding.

9. A lever device according to claim 1, further comprising a supporting device of a holder for a hand-held device, having a first and a second portion, wherein said first portion comprises a system connector adapted to be connected to a corresponding system connector of said hand-held unit, such that the second portion of said supporting device comprises a third and a fourth hinge member adapted to receive the first and second hinge members, respectively, of the lever device in such a way that the lever device is hingedly movable relative to the supporting device.

10. A lever device according to claim 9, wherein its system connector is raised to such an extent that the portion of said hand-held unit provided with said corresponding system connector rests solely on the corresponding system connector, and wherein said system connector is provided with spring-loaded terminals.

11. A lever device according to claim 9, wherein said second portion comprises a first pair of walls forming a first notch, adapted to receive said first spring arm and said guide arm.

12. A lever device according to claim 1, further comprising a holder for a hand-held device, such as a mobile telephone, comprising a system connector adapted to be connected to a corresponding system connector of said hand-held unit, wherein a third and a fourth hinge member hingedly receives the first and second hinge members, respectively, of the lever device, the lever device being movable relative to the holder supporting device about said axis.

13. A lever device according to claim 12, wherein its system connector is raised to such an extent that the portion of said hand-held unit provided with said corresponding system connector rests solely on the corresponding system connector, and wherein said system connector is provided with spring-loaded terminals.

14. A lever device according to claim 13, wherein said spring-loaded terminals are pressed down when a hand-held unit is placed with its corresponding system connector placed thereon while at least said first locking arm is directed substantially towards said system connector.

15. A lever device according to claim 13, wherein said second portion comprises a first pair of walls forming a first notch adapted to receive said first spring arm and said guide arm.

16. A lever device according to claim 2, further comprising a supporting device of a holder for a hand-held device, having a first and a second portion, wherein said first portion comprises a system connector adapted to be connected to a corresponding system connector of said hand-held unit, such that the second portion of said supporting device comprises a third and a fourth hinge member adapted to receive the first and second hinge members, respectively, of the lever device in such a way that the lever device is hingedly movable relative to the supporting device, said system connector being raised to such an extent that the portion of said hand-held unit provided with said corresponding system connector rests solely on the corresponding system connector, said system connector being provided with spring-loaded terminals, wherein said second portion comprises a second pair of walls forming a second notch adapted to receive said second spring arm and said further guide arm.

17. A lever device according to claim 3, further comprising a holder for a hand-held device, such as a mobile telephone, comprising a system connector adapted to be connected to a corresponding system connector of said hand-held unit, wherein a third and a fourth hinge member hingedly receives the first and second hinge members, respectively, of the lever device, the lever device being movable relative to the holder supporting device about said axis, said system connector being raised to such an extent that the portion of said hand-held unit provided with said corresponding system connector rests solely on the corresponding system connector, and wherein said system connector is provided with spring-loaded terminals, said second portion comprising a first pair of walls forming a first notch adapted to receive said first spring arm and said guide arm.

* * * * *

UNITED STATES PATENT AND TRADEMARK OFFICE
CERTIFICATE OF CORRECTION

PATENT NO. : 6,754,343 B2  
APPLICATION NO. : 09/864781  
DATED : June 22, 2004  
INVENTOR(S) : Kristina Lundström et al.

Page 1 of 1

It is certified that error appears in the above-identified patent and that said Letters Patent is hereby corrected as shown below:

| | |
|---|---|
| Face of Patent, Foreign Application Priority Data Section | Insert --Foreign Application Priority Data<br>May 26, 2000 [SE] Sweden-----0001986-9<br>May 8, 2001    Malaysia----PI20012138<br>May 9, 2001    PCT--------PCT/SE01/01011-- |
| Face of Patent, U.S. Patent Documents Section | Insert --5,917,907  6/1999  Kela ---379/446<br>          6,002,921  12/1999  Pfahlert et al---455/90<br>          5,463,688  10/1995  Wijas---379/446-- |
| Face of Patent, After U.S. Patent Documents Section | Insert --FOREIGN PATENT DOCUMENTS<br>    JP 8070343  7/1996  JP<br>    GB 2293718  4/1996  GB-- |
| Face of Patent, After Foreign Documents Section | Insert --OTHER PUBLICATIONS<br>International Search Report; PCT/SE 01/01011; dated 9/2001-- |

Signed and Sealed this

First Day of August, 2006

JON W. DUDAS  
*Director of the United States Patent and Trademark Office*